(12) United States Patent
Hirata et al.

(10) Patent No.: US 9,202,628 B2
(45) Date of Patent: Dec. 1, 2015

(54) LAMINATED CERAMIC CAPACITOR

(71) Applicant: MURATA MANUFACTURING CO., LTD., Nagaokakyo-Shi (JP)

(72) Inventors: Tomotaka Hirata, Nagaokakyo (JP);
Hitoshi Nishimura, Nagaokakyo (JP);
Shinya Isota, Nagaokakyo (JP);
Taketsugu Ogura, Kyoto-Fu (JP);
Masahiro Naito, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 179 days.

(21) Appl. No.: 13/953,043

(22) Filed: Jul. 29, 2013

(65) Prior Publication Data

US 2014/0043722 A1 Feb. 13, 2014

(30) Foreign Application Priority Data

Aug. 9, 2012 (JP) ................. 2012-177072

(51) Int. Cl.
*H01G 4/12* (2006.01)
*H01G 4/30* (2006.01)
*B32B 18/00* (2006.01)
*C04B 35/486* (2006.01)
*C04B 35/49* (2006.01)

(52) U.S. Cl.
CPC ............. *H01G 4/30* (2013.01); *B32B 18/00* (2013.01); *C04B 35/486* (2013.01); *C04B 35/49* (2013.01); *H01G 4/1245* (2013.01); *C04B 2235/3201* (2013.01); *C04B 2235/3203* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3239* (2013.01); *C04B 2235/3262* (2013.01); *C04B 2235/3418* (2013.01); *C04B 2235/6584* (2013.01); *C04B 2235/768* (2013.01);

(Continued)

(58) Field of Classification Search
CPC ..... H01G 4/1227; H01G 4/30; H01G 4/1245; H01G 4/1236; H01G 4/12; H01G 4/1209; H01G 4/232; H01G 4/10
See application file for complete search history.

(56) References Cited

U.S. PATENT DOCUMENTS

2005/0219794 A1* 10/2005 Iguchi et al. ............... 361/321.2
2010/0214717 A1* 8/2010 Nakamura et al. ............. 361/303

FOREIGN PATENT DOCUMENTS

JP H03-133114 A 6/1991
JP 10335169 A 12/1998

(Continued)

OTHER PUBLICATIONS

Machine translation for JP2007-173480.*

(Continued)

*Primary Examiner* — Dion R Ferguson
(74) *Attorney, Agent, or Firm* — Arent Fox LLP

(57) ABSTRACT laminated ceramic capacitor which has favorable moisture resistance includes an inner layer section that has dielectric ceramic layers and internal electrodes stacked alternately, and outer layer sections formed outside the inner layer section. The dielectric ceramic layers have a perovskite-type compound including a main constituent containing Ca and Zr, and an additive containing Si and Mn. The average grain size in the dielectric ceramic layers constituting the outer layer sections is smaller than the average grain size in the dielectric ceramic layers constituting the inner layer section. The Si/Mn molar ratio in the dielectric ceramic near the interfaces between the internal electrodes and the dielectric ceramic layers is ≤15.

3 Claims, 3 Drawing Sheets

(52) U.S. Cl.
CPC ..... *C04B 2235/785* (2013.01); *C04B 2235/786* (2013.01); *C04B 2237/348* (2013.01); *C04B 2237/588* (2013.01); *C04B 2237/704* (2013.01); *H01G 4/1227* (2013.01)

(56) References Cited

FOREIGN PATENT DOCUMENTS

| JP | 2007-123835 A | | 5/2007 | |
| JP | 2007-173480 | * | 7/2007 | ............... H01G 4/12 |
| JP | 2007-266223 A | | 10/2007 | |
| JP | 2009-246105 A | | 10/2009 | |
| WO | WO-2012/046554 A1 | | 4/2012 | |

OTHER PUBLICATIONS

Japanese Office Action issued for counterpart application No. JP 2012-177072, dispatch date Jun. 24, 2014 (English translation attached).

* cited by examiner

LAMINATED CERAMIC CAPACITOR

BACKGROUND OF THE INVENTION

1. Field of the Invention

This invention relates to a laminated ceramic capacitor, and more particularly, relates to a laminated ceramic capacitor using a dielectric ceramic containing, for example, Ca and Zr.

2. Description of the Related Art

Laminated ceramic capacitors have a stacked structure of dielectric ceramic layers and internal electrodes. As a dielectric ceramic material for use in the ceramic layers of these laminated ceramic capacitors, for example, a non-reduced dielectric ceramic material is disclosed which contains a main constituent represented by $[(Ca_XSr_{1-X})O]_m[(Ti_YZr_{1-Y})O_2]$ where the values of X, Y, and m respectively fall within the range of: $0 \le X \le 1$, $0 \le Y \le 0.10$, and $0.75 \le m \le 1.04$, and containing, as accessory constituents, 0.2 to 5 mol % of Mn oxide in terms of MnO, 0.1 to 10 mol % of Al oxide in terms of $Al_2O_3$, and 0.5 to 15 mol % of constituent represented by $[(Ba_ZCa_{1-Z})O]_VSiO_2$ where Z and V respectively fall within the ranges of $0 \le Z \le 1$ and $0.5 \le V \le 4.0$, with respect to the main constituent (see Japanese Patent Application Laid-Open No. 1998-335169).

This dielectric ceramic material is used to prepare a dielectric paste, and the dielectric paste is used to form ceramic green sheets. The ceramic green sheets on which an internal electrode material paste is printed are stacked to form an inner layer section, and ceramic green sheets with no internal electrode material paste printed thereon are further stacked in a manner that sandwiches the inner layer section to form an outer layer section. The obtained laminate is cut into a predetermined shape to form a green chip. Then, the green chip is subjected to firing to form a chip sintered body. A paste for external electrodes is applied to the chip sintered body, and baked to form a laminated ceramic capacitor.

SUMMARY OF THE INVENTION

In a laminated ceramic capacitor using a $CaZrO_3$-based dielectric ceramic, peeling defects at the interfaces between internal electrodes and the dielectric ceramic are likely to occur in a moisture-resistance loading test and the like, as compared with a laminated ceramic capacitor using a $BaTiO_3$ based dielectric ceramic. This is because stress is caused between the internal electrodes and the dielectric ceramic at the stage after firing, due to the fact that $CaZrO_3$ has a larger difference between the linear expansion coefficient of the dielectric ceramic and the linear expansion coefficient of the internal electrode as compared with $BaTiO_3$.

In addition, the grains of the laminated ceramic capacitor using the (Ca, Sr, Ba)(Zr, Ti)$O_3$ based dielectric ceramic as disclosed in Japanese Patent Application Laid-Open No. 1998-335169 are likely to grow in the dielectric when a green chip is subjected to firing, and the average grain size is more likely to be increased in outer layer sections, as compared with an inner layer section constrained by internal electrodes. When the average grain size is increased in the outer layer sections, peeling defects between the grains are likely to occur in a moisture-resistance loading test and the like. The defects in the moisture-resistance loading test are believed to be caused by ingress of a plating solution or moisture through erosion of defective external electrodes and ceramic grain boundaries by the plating solution or moisture. It is considered in this case that larger grain sizes produce more residual stress in the ceramic, make the stress more likely to be released when grain boundaries are eroded, and make cracks more likely caused, as compared with smaller grain sizes.

Therefore, a main object of this invention is to provide a laminated ceramic capacitor that has favorable resistance to moisture.

The present invention provides a laminated ceramic capacitor including: an inner layer section with dielectric ceramic layers and internal electrodes alternately stacked; and an outer layer section with dielectric ceramic layers without internal electrodes, which is formed outside the inner layer section, where the dielectric ceramic layers constituting the inner layer section and the outer layer section contain a perovskite-type compound containing Ca and Zr; and Si and Mn, the average grain size of the dielectric ceramic constituting the outer layer section is smaller than the average grain size of the dielectric ceramic constituting the inner layer section, and the Si/Mn molar ratio in the dielectric ceramic near the interfaces between the internal electrodes and the dielectric ceramic layers (generally about 5 nm or less) is ≤15.

In general, the reduced average grain size in the dielectric ceramic layers reduces residual stress in the ceramic, and improves resistance to corrosive solutions, etc. Therefore, it is considered that the moisture resistance can be improved by reducing the average grain size of the dielectric ceramic constituting the outer layer section. However, it is difficult to ensure sinterability while reducing the average grain size in the fired dielectric ceramic layers. In particular, when the average grain size is reduced, pores are likely to remain in the inner layer section, and defects become likely to occur in a high-temperature loading test and a moisture-resistance loading test. In addition, the pores will also cause a decrease in dielectric constant. Therefore, the average grain size is preferably larger in the inner layer section from the standpoint of ensuring a high dielectric constant. From the foregoing, the average grain size in the outer layer section is preferably reduced to ensure moisture resistance, while increasing the average grain size in the inner layer section to ensure sinterability.

Furthermore, it is known that an increased Si amount in general improves chemical stability in glass, and when an oxide containing Si is formed at grain boundaries of a perovskite-type compound containing Ca and Zr, the increased Si amount improves chemical stability at the grain boundaries, in secondary phases, etc., and improves resistance to ceramic elution into, for example, corrosive solutions, etc. However, the improved chemical stability of the dielectric including the grain boundaries, secondary phases, etc. means that the reaction between the internal electrodes and the dielectric is also inhibited, and the bonding strength is thus decreased at the interfaces between the internal electrodes and the dielectric ceramic layers. Therefore, defects due to peeling at the interfaces are likely to occur when a moisture-resistance loading test and the like is carried out. On the other hand, Mn stabilizes the interfacial bonding between the internal electrodes and the dielectric ceramic layers. In this case, the internal electrodes preferably contain a main constituent of one of Ni and a Ni alloy. Therefore, the control of the Si/Mn molar ratio in the dielectric ceramic near the interfaces between the internal electrodes and the dielectric ceramic layers to a certain value or less can improve the chemical stability of the dielectric ceramic, and prevent peeling the interfaces between the internal electrodes and the dielectric ceramic.

According to this invention, a laminated ceramic capacitor can be obtained which has favorable resistance to moisture.

The above-mentioned object, other objects, features, and advantages of this invention will be further evident from the description in the following DETAILED DESCRIPTION OF THE INVENTION with reference to the drawings.

DETAILED DESCRIPTION OF THE INVENTION

Figure 1:
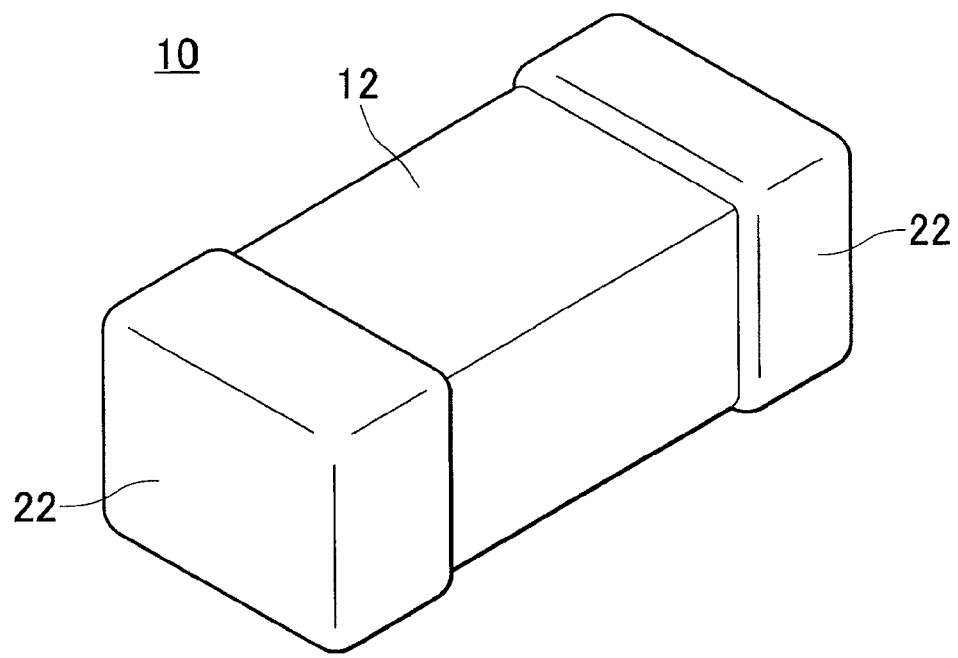
FIG. 1 is a perspective view illustrating an example of a laminated ceramic capacitor according to this invention.
Figure 2:
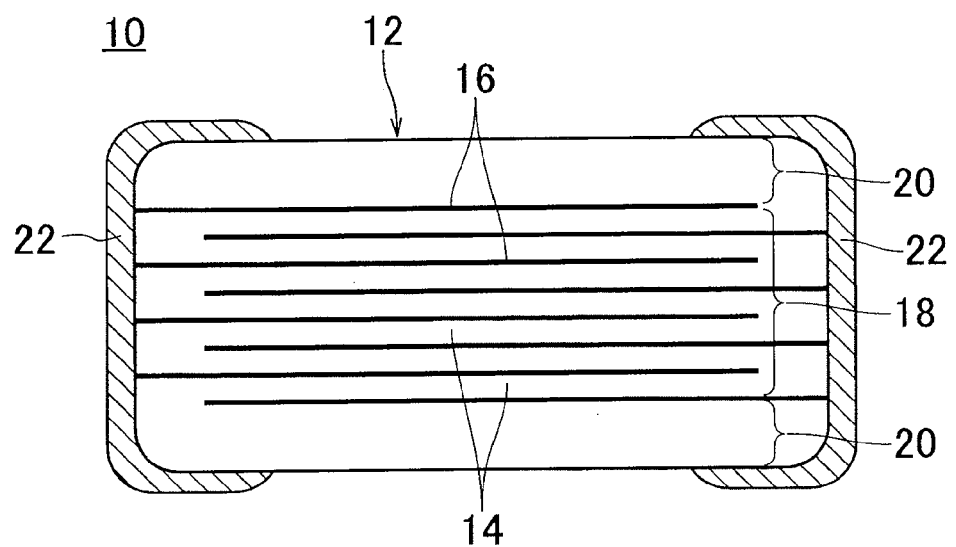
FIG. 2 is a schematic diagram illustrating the internal structure of the laminated ceramic capacitor shown in FIG. 1.

FIG. 1 is a perspective view illustrating an example of a laminated ceramic capacitor according to this invention, and FIG. 2 is a schematic diagram illustrating the internal structure of the capacitor. The laminated ceramic capacitor 10 includes, for example, a cuboid main body 12. The cuboid main body 12 is formed such that multiple dielectric ceramic layers 14 and internal electrodes 16 are stacked alternately. The multiple internal electrodes 16 are opposed in a central portion in a longitudinal direction of the main body 12, and the adjacent internal electrodes 16 are drawn to opposed ends of the main body 12. Therefore, the multiple internal electrodes 16 are drawn (i.e., extend) alternately to the opposed ends of the main body 12. In addition, the internal electrodes 16 in the width direction of the main body 12 are formed in positions spaced at intervals from both ends of the dielectric ceramic layers 14.

The main body 12 includes an inner layer section 18 with the internal electrodes 16 formed therein, and outer layer sections 20 with no internal electrodes 16 formed therein. The inner layer section 18 is formed in a central portion in the stacking direction of the main body 12, whereas the outer layer sections 20 are formed outside in the stacking direction of the main body 12 in a manner that sandwiches the inner layer section 18. Furthermore, external electrodes 22 are formed on the opposed ends of the main body 12. The external electrodes 22 are formed so as to wrap around from the end surfaces of the main body 12 to side surface thereof. The internal electrodes 16 drawn to the ends of the main body 12 are connected to these external electrodes 22. Therefore, electrostatic capacitance is formed between the two external electrodes 22 formed on the both ends of the main body 12.

The dielectric ceramic layers 14 include a perovskite-type compound containing Ca and Zr, and Si and Mn. In this case, the average grain size in the dielectric ceramic layers 14 in the outer layer sections 20 is formed so as to be smaller than the average grain size in the dielectric ceramic layers 14 in the inner layer section 18. Furthermore, the Si/Mn molar ratio in the dielectric ceramic near the interfaces between the internal electrodes 16 and the dielectric ceramic layers 14 is formed so as to bey 15.

Figure 3:
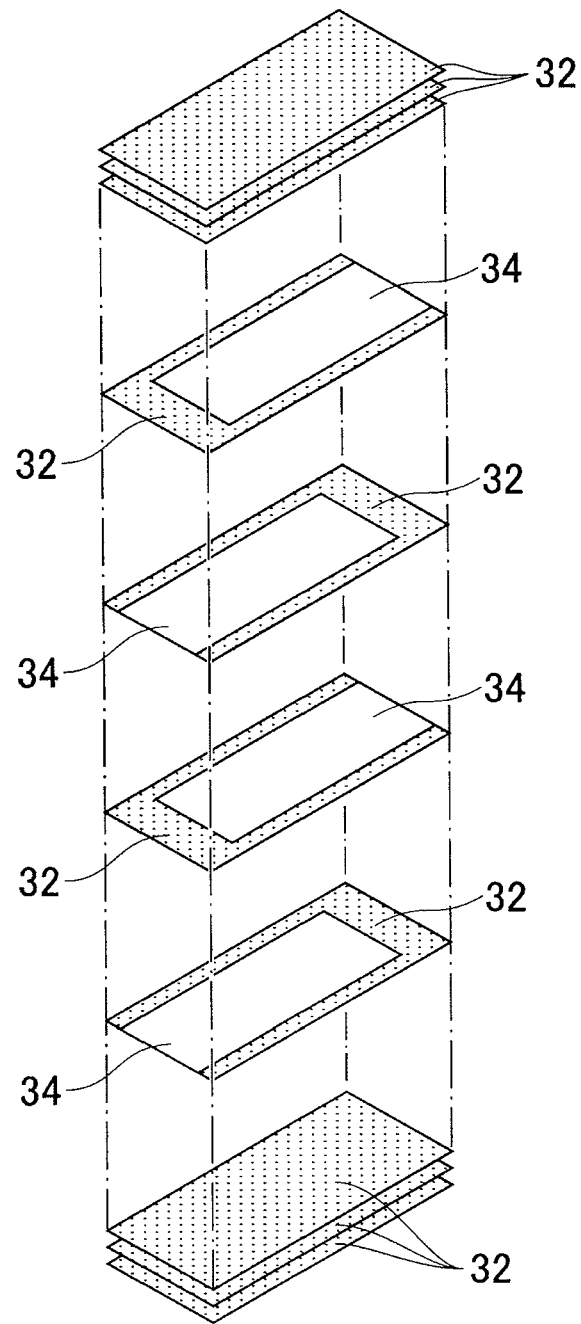
FIG. 3 is a schematic diagram for explaining a method for preparing the laminated ceramic capacitor shown in FIG. 1.

In order to prepare this laminated ceramic capacitor 10, a laminate 30 for obtaining the main body 12 is prepared as shown in FIG. 3. The laminate 30 includes a plurality of rectangular ceramic green sheets 32. The ceramic green sheets 32 are formed by forming a slurry composed of a dielectric ceramic material into the shape of a sheet. On the ceramic green sheets, a conductive paste is printed to form internal electrode patterns 34 in the shape of the internal electrode 16. The multiple internal electrode patterns 34 are opposed in central portions of the ceramic green sheet 32, and drawn to opposite ends on adjacent ceramic green sheets 32.

The laminate 30 is formed by stacking the ceramic green sheets 32 with the internal electrode patterns 34 formed thereon, further stacking, on the both sides, the ceramic green sheets 32 with no internal electrode pattern formed, and applying pressure bonding. The obtained laminate 30 is subjected to firing to form the main body 12. The obtained main body 12 is subjected to barrel polishing, and a conductive paste is applied to both ends of the main body 12, and baked to form the external electrodes 20. If necessary, a Ni plating layer and a Sn plating layer are formed on the external electrodes 20.

In the process of preparing the laminated ceramic capacitor 10, the stack of the ceramic green sheets 32 with the internal electrode patterns 34 formed thereon serves as the inner layer section 18 of the main body 12, whereas the stacks of the ceramic green sheets 32 with no internal electrode patterns formed serve as the outer layer sections 20 of the main body 12.

In this laminated ceramic capacitor 10, the average grain size in the dielectric ceramic layers 14 in the outer layer sections 20 of the main body 12 is smaller than the average grain size in the dielectric ceramic layers 14 in the inner layer section 18 thereof. Therefore, the dielectric ceramic has reduced residual stress in the outer layer sections 20, and can improve resistance to corrosive solutions, etc. As described above, it is considered effective to reduce the average grain size in the dielectric ceramic layers 14 in the outer layer sections 20, in order to improve the moisture resistance of the laminated ceramic capacitor 10.

However, it is difficult to ensure sinterability while reducing the average grain size after firing, and pores are likely to remain in, in particular, the inner layer section 18. When the pores remain, defects will become likely to occur in a high-temperature loading test, a moisture-resistance loading test, and the like. In addition, the pores will also cause a decrease in dielectric constant. Furthermore, the average grain size in the inner layer section 18 is preferably larger from the standpoint of ensuring a high dielectric constant. Therefore, the average grain size in the outer layer sections 20 is preferably reduced while increasing the average grain size in the inner layer section 18 to ensure sinterability. Furthermore, the addition of Mn to the dielectric ceramic layers 14 is considered to improve sinterability through diffusion of Mn into the dielectric ceramic.

In addition, an additive containing Si is included in the dielectric ceramic layers 14. In general, it is known that an increased Si amount improves chemical stability in glass. When an oxide containing Si is formed at grain boundaries of a perovskite-type compound containing Ca and Zr, the increased Si amount improves chemical stability at grain boundaries of and in secondary phases and the like of the dielectric ceramic, as in the case of glass, and improves resistance to elution into, for example, corrosive solutions, etc.

However, while the included additive containing Si improves the chemical stability of the dielectric ceramic, the reaction between the internal electrodes 16 and the dielectric ceramic layers 14 is inhibited to decrease the bonding strength at the interfaces between the internal electrodes 16 and the dielectric ceramic layers 14. Therefore, defects due to peeling at the interfaces will become likely to occur in a moisture-resistance loading test and the like. However, Mn included in the dielectric ceramic layers 14 can stabilize the interfacial bonding between the dielectric ceramic layers 14 and the internal electrodes 16. In this case, the Si/Mn molar ratio in the dielectric ceramic near the interfaces between the internal electrodes 16 and the dielectric ceramic layers 14 is set to be 15. This Si/Mn molar ratio in this range can improve the chemical stability of the dielectric ceramic layers 14, and stabilize the interfacial bonding between the dielectric ceramic layers 14 and the internal electrodes 16.

Example 1

Respective powders of $CaCO_3$, $SrCO_3$, $BaCO_3$, $TiO_2$, and $ZrO_2$ with a purity of 99% or more were prepared as materials for a main constituent constituting the dielectric ceramic. These materials were weighed in predetermined amounts, then subjected to wet mixing in a ball mill, and thereafter, dried and crushed. This powder was subjected to calcination at 900° C. to 1300° C. in the atmosphere, and then crushed to obtain a main constituent powder including a perovskite-type compound containing Ca and Zr. It is to be noted that the method for producing the main constituent may be a solid-phase method, a hydrothermal method, etc. without particular limitation, and the materials may be also carbonates, oxides, hydroxides, etc. without particular limitation.

Next, powders of $SiO_2$, $MnCO_3$, and an oxide of M (where M is an element selected from alkali metals, alkali-earth metals, rare earths, and V) were prepared as additive materials. The additives were weighed in predetermined amounts, and the main constituent powder and the additives were subjected to wet mixing in a ball mill, and thereafter, dried and crushed to obtain a raw material powder.

Tables 1 and 2 shows the result of confirming the obtained raw material powders by an ICP emission spectrometric analysis. In Tables 1 and 2, w represents a molar ratio of Sr/(Ca+Sr+Ba), x represents a molar ratio of Ba/(Ca+Sr+Ba), y represents a molar ratio of Ti/(Zr+Ti+Hf), z represents a molar ratio of Hf/(Zr+Ti+Hf), m represents the total content of Ca, Sr, and Ba in terms of parts by mol with respect to a total content of 1 part by mol of Zr, Ti, and Hf, a represents the content of Si in terms of parts by mol with respect to the total content 100 parts by mol of Zr, Ti, and Hf, b represents the content of Mn in terms of parts by mol with respect to the total content 100 parts by mol of Zr, Ti, and Hf, and c represents the content of M in terms of parts by mol with respect to the total content 100 parts by mol of Zr, Ti, and Hf.

In addition, Tables 1 and 2 show the type of M for each sample. It is to be noted that while Hf maybe mixed in as an impurity in the preparation of the raw material powder or at any other stage of the process for producing the laminated ceramic capacitor, this impurity incorporation will not be problematic for electrical characteristics of the laminated ceramic capacitor.

It is to be noted that the sample numbers marked with "*" in Tables 1 and 2 refer to samples outside the scope of the present invention. The compositions in Tables 1 and 2 are prepared compositions, and for example, the additives may be partially present as a solid solution in the main constituent after the firing. In addition, when YSZ (yttria stabilized zirconia) balls are used as media in the mixing process, constituents may be added from additives other than the weighed additives, such as zirconia balls. Further, it has been confirmed by an ICP emission spectrometric analysis that the obtained raw material powders are nearly identical to the prepared compositions shown in Table 1.

A polyvinyl butyral based binder and an organic solvent such as toluene and ethanol were added to the obtained raw material powder, and subjected to wet mixing in a ball mill to prepare slurry. This slurry was subjected to sheet forming by a doctor blade method, thereby providing ceramic green sheets. Thereafter, a conductive paste mainly containing one of Ni and Cu was printed on the ceramic green sheets to form internal electrode patterns for constituting internal electrodes of the laminated ceramic capacitor. For the conductive paste, one of Ni and Cu powders was used as a metal powder, with the addition of, as a common material, one of Mn oxide and a dielectric powder of the same composition as the main constituent powder, and with no common material added.

The additive amount of the common material preferably falls within the range of 1 mass % to 20 mass % to the metal constituent in the conductive paste. In this example, the additive amount of the common material to the metal powder was adjusted to 13 mass % to 18 mass % when the metal powder in the conductive paste was Ni, whereas the additive amount of the common material to the metal powder was adjusted to 8 mass % to 12 mass % when the metal powder in the conductive paste was Cu.

Next, the multiple ceramic green sheets with the internal electrode patterns formed thereon were stacked so as to alternate the sides to which the internal electrode patterns were drawn, the ceramic green sheets with no internal electrode pattern formed were stacked so as to sandwich the stacked sheets to obtain a stacked body of the ceramic green sheets. The stacked body obtained was heated at a temperature of 200° C. to 800° C. in the atmosphere to burn off the binder, and then subjected to firing under the conditions of rate of temperature increase: 3.33° C./min and maximum temperature: 1200° C. to 1300° C. in an atmosphere with an oxygen partial pressure log $P_{O2}$=−8.0 MPa to −14.0 MPa to obtain a sintered body (main body).

The obtained main body was subjected to barrel polishing to expose the internal electrodes at end surfaces of the main body, and a Cu paste for external electrodes was applied to portions the main body. After drying the Cu paste for external electrodes, the external electrode was baked at 900° C. in a reducing atmosphere. Furthermore, a barrel plating method was used to form Ni plating layers on the external electrodes, and further Sn plating layers thereon.

The laminated ceramic capacitor obtained in this way had external dimensions of: 1.2 mm in width; 2.0 mm in length; and 0.6 mm in thickness, and the dielectric ceramic layers were 3 μm in average thickness. In addition, the total number of effective dielectric ceramic layers was 100.

The laminated ceramic capacitor obtained was evaluated for the average grain sizes of the inner layer section and outer layer sections of the main body, the percent defectives after 1000 hours in a high-temperature loading test, the percent defectives after 1000 hours in a moisture-resistance loading test, and the percent defectives after 250 hours in an accelerated moisture-resistance loading test (PCBT). It is to be noted that a difference in average grain size was produced between the inner layer section and the outer layer sections by varying the degrees of grinding the materials for preparing the ceramic green sheets for the inner layer section and the ceramic green sheets for the outer layer sections, or varying the type or additive amount of the common material contained in the conductive paste. For example, when the common material contained in the conductive paste is a Mn oxide, the Mn diffuses into the inner layer section during sintering to further improve sinterability in the inner layer section as compared with the outer layer sections, and produce a difference in average grain size. Furthermore, the result is shown in Table 1.

The average grain size was measured by the following method. With the length direction, width direction, and thickness direction of the sample (laminated ceramic capacitor) respectively represented by an L direction, a W direction, and a T direction, the sample was fractured so that a WT cross section was exposed in a position on the order of ½ of the length in the L direction. In order to make grain boundaries of the ceramic clear, a heat treatment was then applied to the fractured sample. The temperature for the heat treatment was considered as a temperature for no grain growth, and for clear grain boundaries, and the heat treatment was carried out at 1000° C. in this example.

Figure 4:
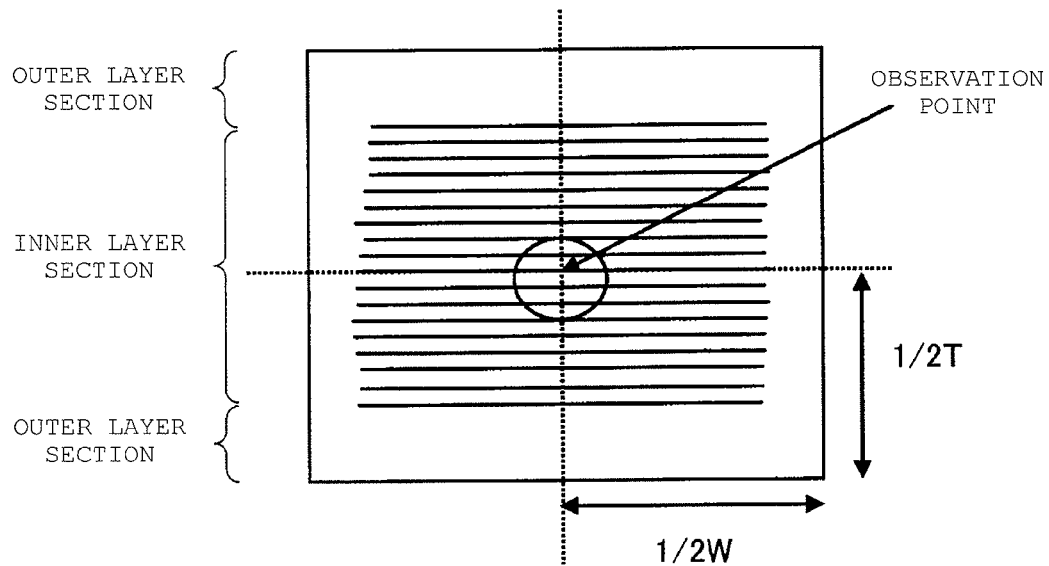
FIG. 4 is a schematic diagram indicating an observation point of an internal layer section in Example 1.
Figure 5:
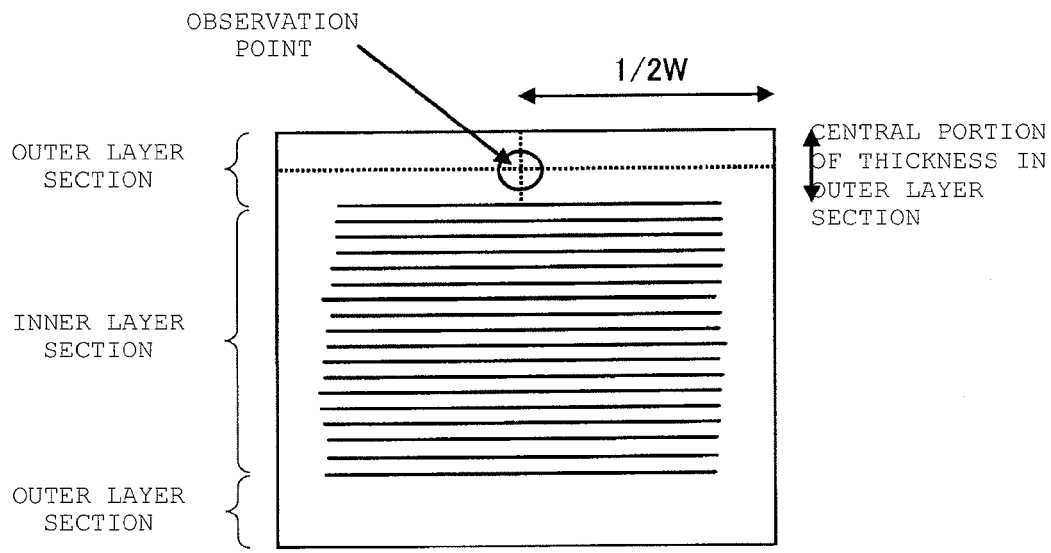
FIG. 5 is a schematic diagram indicating an observation point of an outer layer section in Example 1.

Next, grain size measurements were carried out. For grain sizes in the inner layer section, grain sizes in the dielectric ceramic layers were observed at 10000-fold magnification under a scanning electron microscope (SEM) in a position (near the center of the chip) on the order of ½ in each of the W direction and T direction in the WT cross section as shown in FIG. 4. In addition, for the average grain size in the outer layer section, the same measurement was carried out in a position (near the center of the outer layer section) on the order of ½ in each of the W direction and T direction in the outer layer section as shown in FIG. 5. Fifty grains for each region were extracted randomly from the obtained SEM images, the area inside the grain boundary for each grain was obtained by an image analysis to calculate the equivalent circle diameter, and the equivalent circle diameter was assumed as the grain size for each crystal grain.

These grain size measurements were carried out for three laminated ceramic capacitors under each condition. Therefore, the number of pieces of data is fifty crystal grains×three chips=150 pieces of data. The shape for each crystal grain was assumed as a sphere with the grain size as a diameter, and the volume for each crystal grain was calculated as the volume of the sphere. The average grain size under each condition was calculated as a volume average grain size from the grain size and the volume.

In the high-temperature loading test, a test voltage of 100 V was applied to seventy-two samples in an atmosphere at a temperature of 150° C. to carry out the test for 1000 hours, and the insulation resistances were then measured. The samples with an insulation resistance of $10^{11} \Omega$ or less were determined as defectives to obtain the percent defectives.

In the moisture-resistance loading test, a test voltage of 25 V was applied to seventy-two samples in an atmosphere at a temperature of 70° C. and humidity of 95% RH to carry out the test for 1000 hours, and the insulation resistances were then measured. The samples with an insulation resistance of $10^{11} \Omega$ or less were determined as defectives to obtain the percent defectives.

In the accelerated moisture-resistance loading test (PCBT), a test voltage of 50 V was applied to one hundred samples in an atmosphere at a temperature of 121° C., humidity of 100% RH, and an atmospheric pressure of 202.65 kPa to carry out the test for 250 hours, and the number of chips showing peeling at an interface between the internal electrode and the dielectric ceramic was measured. The evaluation for peeling was made by an ultrasonic test (85 MHz).

In addition, the Si/Mn molar ratio at the interface between the internal electrode and the dielectric ceramic was measured by an XPS analysis. For the laminated ceramic capacitor not subjected to any of the high-temperature loading test, etc., side surface sections with no internal electrodes formed thereon and end surface sections with the internal electrodes connected to only one of the external electrodes were removed by dry polishing to leave only the central portion with all of the internal electrodes stacked therein. Then, the section left after the polishing was subjected to mechanical peeling at the interface between the internal electrode and the dielectric ceramic in a central portion in the stacking direction to obtain the peeled LW surface. Then, the peeled surface with the dielectric ceramic exposed was subjected to an XPS (X-ray Photoelectron Spectroscopy) analysis (Quantum2000/Measurement Field 100 μmφ from PHYSICAL ELECTRONICS, Inc.) to quantify Si and Mn from the Si2p and Mn2p scan spectra. The detection depth in this evaluation method is 5 nm or less. The measurement of the Si/Mn molar ratio was carried out on five measurement points in total: a central portion of the LW peeled surface+four random points, for two chips in number under each condition, the Si/Mn molar ratio was calculated from the average value for the measurements. The results of these tests are shown in Tables 1 and 2.

TABLE 1

$100(Ca_{1-w-x}Sr_wBa_x)_m(Zr_{1-y-z}Ti_yHf_z)O_3 + aSi + bMn + cM$

| Sample Number | w | x | y | z | m | a | b | c | M | Internal Electrode Metal | Internal Electrode Common Material |
|---|---|---|---|---|---|---|---|---|---|---|---|
| 1 | 0.00 | 0.00 | 0.00 | 0.02 | 1.000 | 2.00 | 2.00 | 0.10 | Al | Ni | Mn Oxide |
| 2 | 0.75 | 0.22 | 0.06 | 0.02 | 1.025 | 1.20 | 0.90 | 0.40 | Y | Ni | Mn Oxide |
| 3 | 0.70 | 0.25 | 0.04 | 0.02 | 1.025 | 1.20 | 0.90 | 0.20 | V | Ni | Mn Oxide |
| 4 | 0.00 | 0.00 | 0.49 | 0.02 | 0.990 | 3.00 | 1.00 | 0.00 | — | Ni | Mn Oxide |
| 5 | 0.00 | 0.00 | 0.33 | 0.01 | 0.998 | 1.40 | 2.80 | 0.00 | — | Ni | Mn Oxide |
| 6 | 0.01 | 0.00 | 0.01 | 0.10 | 1.002 | 1.50 | 2.00 | 0.00 | — | Ni | Mn Oxide |
| 7 | 0.01 | 0.00 | 0.01 | 0.02 | 0.900 | 1.50 | 2.00 | 0.00 | — | Ni | Mn Oxide |
| 8 | 0.01 | 0.00 | 0.01 | 0.02 | 1.100 | 1.50 | 2.00 | 0.00 | — | Ni | Mn Oxide |
| 9 | 0.01 | 0.00 | 0.01 | 0.02 | 1.005 | 0.10 | 0.20 | 0.10 | Al | Ni | Mn Oxide |
| 10 | 0.01 | 0.00 | 0.01 | 0.02 | 1.005 | 20.00 | 20.00 | 3.00 | Li | Cu | Mn Oxide |
| 11 | 0.72 | 0.22 | 0.05 | 0.01 | 1.025 | 0.90 | 1.50 | 0.07 | V | Ni | No |
| *12 | 0.01 | 0.00 | 0.01 | 0.02 | 1.005 | 1.80 | 0.90 | 3.00 | Li | Ni | No |
| *13 | 0.01 | 0.00 | 0.01 | 0.02 | 1.005 | 20.00 | 20.00 | 3.00 | Li | Li | (Ca,Sr,Ba)(Zr,Ti)O$_3$ Based Dielectric |
| *14 | 0.00 | 0.00 | 0.00 | 0.02 | 1.000 | 2.00 | 2.00 | 0.10 | Al | Ni | (Ca,Sr,Ba)(Zr,Ti)O$_3$ Based Dielectric |

TABLE 1-continued $100(Ca_{1-w-x}Sr_wBa_x)_m(Zr_{1-y-z}Ti_yHf_z)O_3 + aSi + bMn + cM$

| Sample Number | Average Grain Size in Inner Layer Section (μm) | Average Grain Size in Outer Layer Sections (μm) | Interfacial Si/Mn Molar Ratio | Percent Defective (%) in High-Temperature Loading Test | Percent Defective (%) in Moisture-Resistance Loading Test | The Number of Peeling Defectives after PCBT |
|---|---|---|---|---|---|---|
| 1 | 0.6 | 0.5 | 25 | 0 | 0 | 0 |
| 2 | 1.4 | 1.0 | 13.0 | 0 | 0 | 0 |
| 3 | 1.2 | 0.9 | 13.8 | 0 | 0 | 0 |
| 4 | 0.7 | 0.5 | 15.0 | 0 | 0 | 0 |
| 5 | 0.6 | 0.5 | 0.9 | 0 | 0 | 0 |
| 6 | 0.8 | 0.7 | 3.6 | 0 | 0 | 0 |
| 7 | 0.8 | 0.6 | 9.3 | 0 | 0 | 0 |
| 8 | 0.8 | 0.4 | 2.7 | 0 | 0 | 0 |
| 9 | 1.0 | 0.6 | 0.1 | 0 | 0 | 0 |
| 10 | 0.9 | 0.6 | 5.2 | 0 | 0 | 0 |
| 11 | 1.0 | 0.9 | 11.2 | 0 | 0 | 0 |
| *12 | 0.6 | 0.7 | 15.5 | 2 | 3 | 4 |
| *13 | 0.6 | 0.7 | 15.5 | 6 | 3 | 4 |
| *14 | 0.5 | 0.6 | 20.7 | 17 | 1 | 13 |

TABLE 2

| Sample Number | w | x | y | z | m | a | b | c | M | Internal Electrode Metal | Internal Electrode Common Material |
|---|---|---|---|---|---|---|---|---|---|---|---|
| *15 | 0.00 | 0.00 | 0.33 | 0.01 | 0.990 | 1.40 | 2.80 | 0.00 | — | Ni | (Ca,Sr,Ba)(Zr,Ti)O$_3$ Based Dielectric |
| 16 | 0.01 | 0.00 | 0.01 | 0.02 | 1.005 | 2.50 | 3.00 | 0.00 | — | Ni | Mn Oxide |
| *17 | 0.01 | 0.00 | 0.01 | 0.02 | 1.005 | 2.50 | 3.00 | 0.00 | — | Ni | (Ca,Sr,Ba)(Zr,Ti)O$_3$ Based Dielectric |
| *18 | 0.80 | 0.20 | 0.10 | 0.02 | 1.025 | 1.20 | 0.90 | 0.40 | V | Ni | (Ca,Sr,Ba)(Zr,Ti)O$_3$ Based Dielectric |
| 19 | 0.01 | 0.00 | 0.01 | 0.02 | 1.003 | 2.50 | 3.00 | 1.00 | Mg | Ni | Mn Oxide |
| *20 | 0.01 | 0.00 | 0.01 | 0.02 | 1.070 | 1.00 | 0.70 | 0.20 | V | Ni | (Ca,Sr,Ba)(Zr,Ti)O$_3$ Based Dielectric |
| 21 | 0.40 | 0.00 | 0.05 | 0.02 | 1.010 | 4.00 | 1.00 | 2.00 | Y | Ni | Mn Oxide |
| 22 | 0.10 | 0.00 | 0.02 | 0.02 | 1.050 | 1.50 | 0.10 | 2.00 | Nd | Ni | Mn Oxide |
| 23 | 0.10 | 0.00 | 0.02 | 0.02 | 1.000 | 3.50 | 1.30 | 2.00 | Dy | Ni | Mn Oxide |
| *24 | 0.00 | 0.00 | 0.00 | 0.02 | 0.950 | 2.00 | 2.00 | 0.10 | V | Ni | Mn Oxide |
| *25 | 0.70 | 0.25 | 0.04 | 0.02 | 1.010 | 0.90 | 1.20 | 0.10 | V | Ni | (Ca,Sr,Ba)(Zr,Ti)O$_3$ Based Dielectric |

| Sample Number | Average Grain Size in Inner Layer Section (μm) | Average Grain Size in Outer Layer Sections (μm) | Interfacial Si/Mn Molar Ratio | Percent Defective (%) in High-Temperature Loading Test | Percent Defective (%) in Moisture-Resistance Loading Test | The Number of Peeling Defectives after PCBT |
|---|---|---|---|---|---|---|
| *15 | 0.5 | 0.7 | 15.1 | 11 | 3 | 2 |
| 16 | 0.6 | 0.5 | 4.6 | 0 | 0 | 0 |
| *17 | 0.6 | 0.9 | 16.8 | 11 | 7 | 3 |
| *18 | 1.8 | 1.4 | 15.6 | 3 | 17 | 10 |
| 19 | 0.9 | 0.8 | 6.3 | 0 | 0 | 0 |
| *20 | 0.5 | 0.6 | 17.3 | 17 | 3 | 7 |
| 21 | 1.1 | 0.9 | 1.9 | 0 | 0 | 0 |
| 22 | 0.7 | 0.6 | 6.0 | 0 | 0 | 0 |
| 23 | 0.8 | 0.7 | 3.8 | 0 | 0 | 0 |
| *24 | 0.6 | 0.7 | 12.0 | 0 | 3 | 2 |
| *25 | 1.3 | 1.4 | 15.2 | 3 | 0 | 0 |

From Table 1, it is determined that as long as the average grain size in the outer layer sections of the main body is smaller than the average grain size in the inner layer section, and as long as the Si/Mn molar ratio of the dielectric ceramic near the interface between the internal electrode and the dielectric ceramic is ≤15, that is, within the scope of the present invention, there are no defects caused in the high-temperature loading test, there is a favorable bonding property at the interface between the internal electrode and there is a reduced number of defects in the moisture-resistance loading test and number of peeling defects in the PCBT.

In contrast, when the average grain size in the outer layer sections of the main body is larger than the average grain size in the inner layer section, or when the Si/Mn molar ratio is greater than 15, the percent defective is increased in the high-temperature loading test and the moisture-resistance loading test, or the number of peeling defects is increased after the PCBT. It is believed to be for the reasons as described above that these results are produced.

Further, as a method for achieving the structure as in the present invention, many methods are conceivable, such as varying, in terms of grain size and composition, raw material powders for the ceramic green sheets for the preparation of the inner layer section and the ceramic green sheets for the preparation of the outer layer sections.

What is claimed is:

1. A laminated ceramic capacitor comprising an inner layer section having dielectric ceramic layers and internal electrodes alternately stacked; and an outer layer section having dielectric ceramic layers without internal electrodes, the outer layer section disposed outside the inner layer section,
   wherein the dielectric ceramic layers constituting the inner layer and outer layer sections comprise a perovskite-type compound containing Ca and Zr; and Si and Mn,
   an average grain size of the dielectric ceramic constituting the outer layer section smaller than an average grain size of the dielectric ceramic constituting the inner layer section, and
   a Si/Mn molar ratio in the dielectric ceramic near interfaces between the internal electrodes and the dielectric ceramic layers of ≤15,
   the Si/Mn molar ratio is 0.1 to 13,
   the difference between the average grain size of the dielectric ceramic constituting the outer and inner layer sections is at least 0.1 μm, and
   the dielectric ceramic is of the formula $(Ca_{1-w-x}Sr_wBa_x)_m(Zr_{1-y-z}Ti_yHf_z)O_3$ in which w is 0-0.72, x is 0-0.25, y is 0-0.49, z is 0.01-0.02, and m is 0.990-1.05.

2. The laminated ceramic capacitor according to claim 1, wherein the molar amounts of each of Si and Mn are 0.1 to 20 per 100 moles of the perovskite.

3. The laminated ceramic capacitor according to claim 2, wherein the dielectric ceramic additionally contains up to 3 moles per 100 moles of perovskite of an element selected from the group consisting of an alkali metal, an alkali earth metal, a rare earth metal and V.

* * * * *